(12) United States Patent
Uyeki et al.

(10) Patent No.: US 10,857,900 B2
(45) Date of Patent: Dec. 8, 2020

(54) METHODS AND SYSTEMS FOR SCHEDULING UTILITY EVENTS INTO A CHARGING SCHEDULE

(71) Applicant: HONDA MOTOR CO., LTD., Tokyo (JP)

(72) Inventors: Robert Uyeki, Torrance, CA (US); Narendran Ravi, Torrance, CA (US); Mohitash Brijwasi, La Palma, CA (US); Maira Malik, Oakland, CA (US); Steven Rho, Atlanta, GA (US); Aparajithan Rajendran, Torrance, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 376 days.

(21) Appl. No.: 15/842,417

(22) Filed: Dec. 14, 2017

(65) Prior Publication Data
US 2019/0184844 A1 Jun. 20, 2019

(51) Int. Cl.
*B60L 53/65* (2019.01)
*G05B 15/02* (2006.01)
*H02J 7/00* (2006.01)
*G06Q 30/02* (2012.01)
*B60L 58/12* (2019.01)

(52) U.S. Cl.
CPC ............... *B60L 53/65* (2019.02); *B60L 58/12* (2019.02); *G05B 15/02* (2013.01); *G06Q 30/0207* (2013.01); *H02J 7/007* (2013.01); *B60L 2240/62* (2013.01)

(58) Field of Classification Search
CPC ..... B60L 53/65; B60L 58/12; G06Q 30/0207; H02J 7/007
USPC .......................................................... 320/109
See application file for complete search history.

(56) References Cited

U.S. PATENT DOCUMENTS

| | | | |
|---|---|---|---|
| 8,594,859 B2 | 11/2013 | Contreras Delpiano et al. | |
| 8,972,074 B2 | 3/2015 | Tyagi et al. | |
| 9,315,108 B2 | 4/2016 | Yokoyama et al. | |

(Continued)

OTHER PUBLICATIONS

"Open Vehicle-Grid Integration Platform: General Overview," EPRI, Palo Alto, CA: 3002008705, https://www.epri.com/#/pages/product/000000003002008705/,2016.

*Primary Examiner* — Richard V Muralidar
(74) *Attorney, Agent, or Firm* — Arent Fox LLP

(57) ABSTRACT

Systems and methods for an electric vehicle to be charged according to a charging schedule. The system includes a memory that stores instructions for executing processes for scheduling charging of an electric vehicle. The system also includes a a processor configured to execute the instructions The instructions cause the processor to: determine a location of an electric vehicle and a time corresponding to when the electric vehicle is connected to a charging station; determine charging preferences of a user based upon a preselected set of choices defined by the user. Further, the instructions case the processor to determine a state of charge of the electric vehicle, determine a departure time of the electric vehicle from the charging station, determine charging incentives based on utility events, and adjust the charging schedule based upon at least one of the state of charge, the departure time and the charging incentives; and start to charge the electric vehicle based upon the charging preferences and the charging schedule.

12 Claims, 6 Drawing Sheets

(56) References Cited

U.S. PATENT DOCUMENTS

| | | |
|---|---|---|
| 9,393,879 B2 | 7/2016 | Tyagi et al. |
| 9,409,492 B2 | 8/2016 | Uyeki |
| 2016/0009188 A1* | 1/2016 | Yokoyama ............... B60L 1/003 701/22 |

* cited by examiner

METHODS AND SYSTEMS FOR SCHEDULING UTILITY EVENTS INTO A CHARGING SCHEDULE

TECHNICAL FIELD

The present disclosure relates to methods and systems for scheduling charging of an electric vehicle.

BACKGROUND

An electric vehicle uses one or more electric motors for propulsion of the vehicle. The electric motors may be powered by rechargeable batteries on-board the vehicle. A driver of an electric vehicle typically recharges the batteries of the vehicle according to different charging schedules that transfer electric energy to the vehicle. A utility company supplies the electric energy to the charging station and charges the driver for the electric energy based upon a variety of factors, for example, the time, day, month, and/or calendar season when the electric energy is provided. Typically, a utility company charges are based on off-peak versus peak hours, with peak hours being more expensive than off-peak hours. If a vehicle is set to recharge based upon being connected to a charging station, a user is immediately charged for the electric energy provided, regardless of price. However, in some instances, it may be beneficial to the user to connect the electric vehicle to a charging station at a different time to take advantage of the lower cost of energy during off-peak hours. In such instances, it is difficult to determine if and when a utility company offers reduced pricing for the energy provided.

SUMMARY

The following presents a summary of one or more aspects of the disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the disclosure in a simplified form as a prelude to the more detailed description that is presented later.

In an example, a method for scheduling utility events into a charging schedule is provided. The method includes determining, a location of an electric vehicle and a time period corresponding to when the electric vehicle is connected to a charging station. In addition, the method includes determining charging preferences of a user based upon a preselected set of preferences defined by the user. When the charging preferences adjust a charging schedule, the method further includes determining a state of charge of the electric vehicle, determining a departure time of the electric vehicle from the charging station, determining charging incentives based on utility events, and adjusting the charging schedule based upon at least one of the state of charge, the departure time and the charging incentives. The method also includes starting to charge the electric vehicle based upon the charging preferences and the charging schedule.

In another example, a system is provided that includes a vehicle charging scheduling system, which includes a memory, and at least one processor coupled to the memory. The at least one processor is configured to determine a location of an electric vehicle and a time corresponding to when the electric vehicle is connected to a charging station. The processor is further configured to determine charging preferences of a user based upon a preselected set of choices defined by the user; and when the charging preferences adjust a charging schedule: determine a state of charge of the electric vehicle, determine a departure time of the electric vehicle from the charging station, determine charging incentives based on utility events, and adjust the charging schedule based upon at least one of the state of charge, the departure time and the charging incentives. The processor is further configured to start to charge the electric vehicle based upon the charging preferences and the charging schedule.

In a further example, a non-transitory computer-readable medium storing computer executable code for scheduling utility events into a charging schedule of a vehicle is provided. The code includes instructions to cause a processor to determine a location of an electric vehicle and a time corresponding to when the electric vehicle is connected to a charging station. The code includes instructions to cause a processor to determine charging preferences of a user based upon a preselected set of choices defined by the user, and when the charging preferences adjust a charging schedule: determine a state of charge of the electric vehicle, determine a departure time of the electric vehicle from the charging station, determine charging incentives based on utility events, and adjust the charging schedule based upon at least one of the state of charge, the departure time and the charging incentives. Further, the code includes instructions to cause a processor to start to charge the electric vehicle based upon the charging preferences and the charging schedule.

To the accomplishment of the foregoing and related ends, the one or more aspects of the disclosure comprise the features hereinafter fully described and particularly pointed out in the claims. The following description and the annexed drawings set forth in detail certain illustrative features of the one or more aspects. These features are indicative, however, of but a few of the various ways in which the principles of various aspects can be employed, and this description is intended to include all such aspects and their equivalents.

BRIEF DESCRIPTION OF THE DRAWINGS

The novel features believed to be characteristic of aspects described herein are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
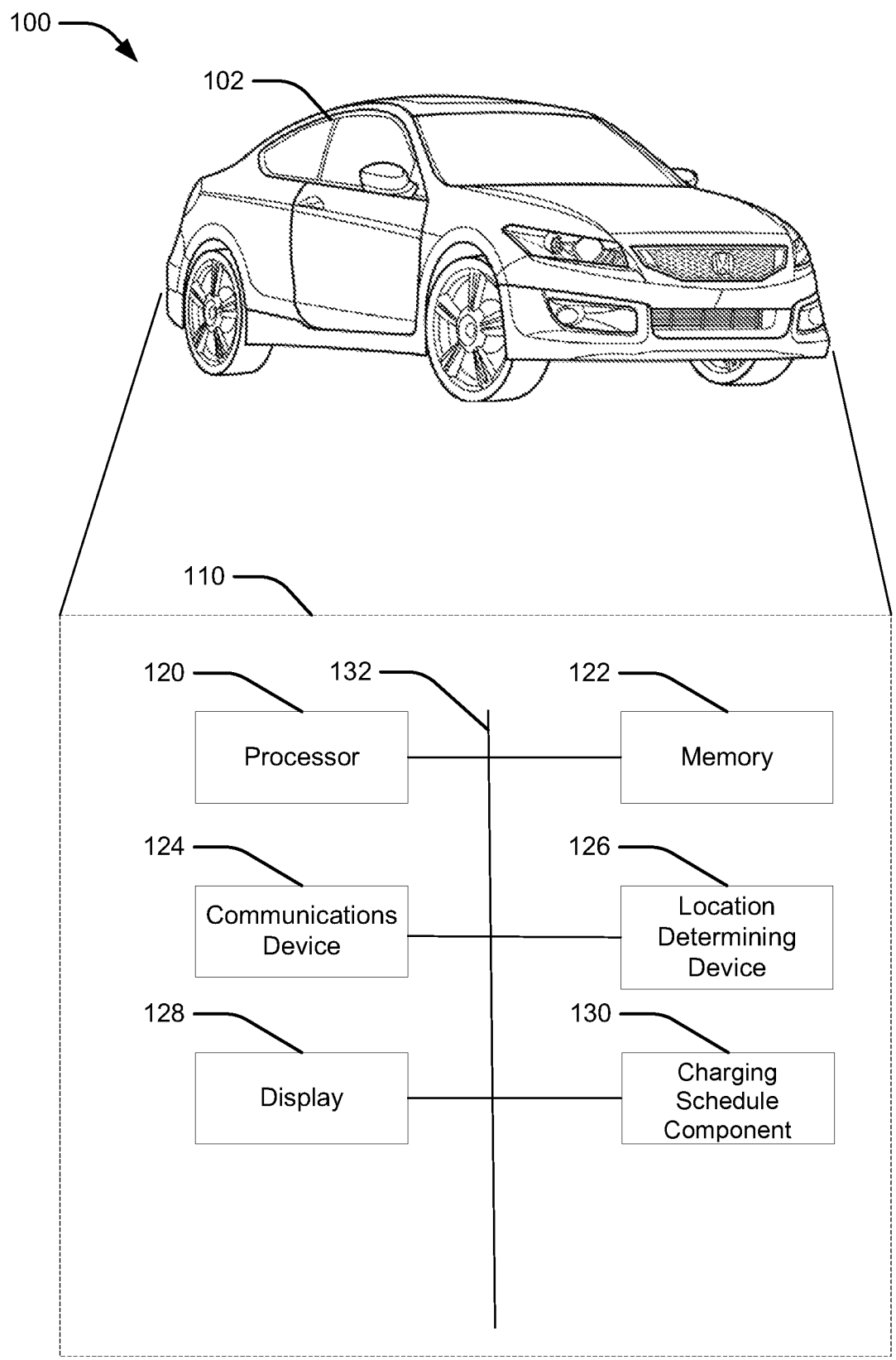
FIG. 1 illustrates a schematic view of an example operating environment of a vehicle charging scheduling system according to one aspect of the disclosure.

The following includes definitions of selected terms employed herein. The definitions include various examples and/or forms of components that fall within the scope of a term and that can be used for implementation. The examples are not intended to be limiting.

The term "bus," as used herein, can refer to an interconnected architecture that is operably connected to transfer data between computer components within a singular or multiple systems. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Local Interconnect Network (LIN), among others.

The term "charging schedule," as used herein, can include a collection of parameters and corresponding data values related to charging an electronic vehicle. The charging schedule can be stored in a memory of the electronic vehicle and/or at a remote location, and can include parameters such as a charging location at which the electronic vehicle can charge a battery, a start time and/or duration of one or more charging operations performed for the electronic vehicle at the charging location, preferences regarding maximum and minimum states of battery charges, energy utility preferences, and/or similar parameters.

The term "electronic vehicle," as used herein, can refer to any moving vehicle that is capable of carrying one or more human occupants and is powered by an electronic battery and/or any form of energy that can be recharged at a charging station. The term "electronic vehicle" can include, but is not limited to: cars, trucks, vans, minivans, SUVs, motorcycles, scooters, boats, personal watercraft, and aircraft.

The term "memory," as used herein, can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

The term "operable connection," as used herein, can include a connection by which entities are "operably connected", is one in which signals, physical communications, and/or logical communications can be sent and/or received. An operable connection can include a physical interface, a data interface and/or an electrical interface.

The term "processor," as used herein, can refer to a device that processes signals and performs general computing and arithmetic functions. Signals processed by the processor can include digital signals, data signals, computer instructions, processor instructions, messages, a bit, a bit stream, or other computing that can be received, transmitted and/or detected. A processor, for example, can include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described herein.

The term "telematics system," as used herein, can refer to a system that facilitates intercommunication among vehicle systems, communication with the vehicle systems via one or more other systems or devices, etc. In an example, telematics systems can interface with other systems, such as a remote device, other computers, etc., via a wireless communication technology, such as a cellular technology, Bluetooth, etc. using a corresponding modem or transceiver.

The term "vehicle system," as used herein, can refer to an electronically controlled system on a vehicle operable to perform certain actions on components of the vehicle, which can provide an interface to allow operation by another system or graphical user interaction. The vehicle systems can include, but are not limited to, vehicle ignition systems, vehicle conditioning systems (e.g., systems that operate a windshield wiper motor, a windshield washer fluid motor or pump, a defroster motor, heating, ventilating, and air conditioning (HVAC) controls, etc.), vehicle audio systems, vehicle security systems, vehicle video systems, vehicle infotainment systems, vehicle telephone systems, and the like.

The detailed description set forth below in connection with the appended drawings is intended as a description of various configurations and is not intended to represent the only configurations in which the concepts described herein can be practiced. The detailed description includes specific details for the purpose of providing a thorough understanding of various concepts. However, it will be apparent to those skilled in the art that these concepts can be practiced without these specific details. In some instances, well known structures and components are shown in block diagram form in order to avoid obscuring such concepts.

Several aspects of certain systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements can be implemented using electronic hardware, computer software, or any combination thereof. Whether such elements are implemented as hardware or software depends upon the particular application and design constraints imposed on the overall system.

By way of example, an element, or any portion of an element, or any combination of elements can be implemented with a "processing system" that includes one or more processors. One or more processors in the processing system can execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, the functions described can be implemented in hardware, software, firmware, or any combination thereof. If implemented in software, the functions can be stored on or encoded as one or more instructions or code on a computer-readable medium. Computer-readable media includes computer storage media. Storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

FIG. 1 shows a schematic view of an example operating environment 100 of a vehicle charging scheduling system 110 and example methods according to aspects described herein. For example, operating environment 100 can include a vehicle 102 within which the vehicle charging scheduling system 110 can at least partially reside and/or be implemented. Components of the vehicle charging scheduling system 110, as well as the components of other systems, hardware architectures and software architectures discussed herein, can be combined, omitted or organized into different architectures for various aspects of the disclosure. However, the example aspects and configurations discussed herein focus on the operating environment 100 as illustrated in FIG. 1, with corresponding system components and related methods.

The vehicle charging scheduling system 110 can include or be operably coupled with (or executed by) one or more processors 120 and one or more memories 122 that communicate to effectuate certain functions or actions, as described herein. For example, the vehicle charging scheduling system 110 may include a communications device 124, which may include substantially any wired or wireless device, or related modem, etc., for providing wired or wireless computer communications utilizing various protocols to send/receive electronic signals internally to features and systems within the vehicle 102 and/or to external devices. In an example, communications device 124 can communicate using one or more radio technologies (e.g., 3GPP radio access technologies, IEEE 802.11, Bluetooth®, etc.). The vehicle charging scheduling system 110 can additionally include or be operably coupled with a location determining device 126 for determining a location of the vehicle 102 and/or one or more location-related parameters, such as speed, acceleration, etc. For example, location determining device 126 can include or can be operably coupled with a global positioning system (GPS) device (or other latitude/longitude determination device), a speedometer, an accelerometer, a gyroscope, and/or the like, to determine the location-related parameters.

Additionally, the vehicle charging scheduling system 110 can include a display 128 for displaying one or more interfaces related to one or more charging schedules. For example, display 128 can include a liquid crystal display (LCD) and/or variants thereof, plasma display, etc., and/or can be part of a touchscreen display. In some examples, one or more of the components described for the vehicle charging scheduling system 110 can be part of another system. For example, display 128 can be part of an infotainment system of the vehicle 102. Similarly, location determining device 126 can be part of a navigation system of the vehicle 102, etc. Moreover, the various components of the vehicle charging scheduling system 110 can be operably coupled to one another via one or more busses 132 to facilitate communication among the components to perform functions described herein.

Additionally, the display 128 may be configured to accept inputs from user to regarding the charging schedule. For example, some inputs may include preferences of a user to charge a vehicle immediately upon connection to a charging station, to charge the vehicle during the most economical times, and/or to participate in cost saving programs offered by utility companies. Further, the user may input the times a user may depart from a location, the duration of charging at a specific period time, and a target state of charge of the vehicle upon departure from a location. Additionally, the user may input information regarding utility providers that are associated with and enroll into energy savings programs.

The vehicle 102 may include an electric motor, which may be powered by rechargeable batteries (not shown) on-board the vehicle 102. The on-board batteries may be charged when the vehicle 102 is connected to a charging station. In some aspects, the vehicle charging scheduling system 110 may be connected to a charging station via a charging cable. In other aspects, the vehicle charging scheduling system 110 may be connected to the charging station wirelessly. The charging station may be a device that provides electric energy to the vehicle 102. The electric energy may be supplied to the charging station by a third party, such as a utility company, through an electrical grid. In some aspects, the charging station may be located at a driver's home or office. In some aspects, the charging station may be located at a public location, such as a retail shopping center or a rest stop.

In some aspects, in a default charging schedule mode, the charging schedule component may initiate charging the vehicle 102 regardless of the current cost of electric energy. In other aspects, in the adjusted charging schedule mode, the charging schedule component may initiate charging the vehicle 102 regardless of the current cost of electric energy, and continues charging the vehicle 102 until the state of charge of the battery of the vehicle 102 reaches a minimum state of charge. Once the battery reaches the minimum state of charge, the control unit may postpone charging the remainder of the battery until the cost of charging the battery is reduced, such as during off-peak times. In yet other aspects, in the adjusted charging schedule mode, the charging schedule component may initiate charging the vehicle when the costs of the electric energy are reduced, e.g., during off-peak hours. The different adjustments of the charging schedule will be discussed in detail below. Further, these modes may be adjusted based upon user inputs, energy utility companies, and energy incentives to reduce the costs associated with charging the vehicle.

In addition, for example, vehicle charging scheduling system 110 can include a charging scheduling component 130 to manage generating, maintaining, storing, etc., multiple charging schedules for the vehicle 102. For example, the charging schedules can correspond to a charging location where a charging operation (e.g., to charge a battery of the vehicle 102) is performed, the utility company which is providing the energy during the charging operation, a user which initiates the charging of the vehicle and incentives to charge the vehicle at specific times to reduce the cost of energy. The charging schedules can also include corresponding start times and duration, etc., an average or otherwise modeled start time and duration, etc., and/or the like, of charging performed for the vehicle 102. In other examples, the charging schedules can include additional charging parameters, such as a charging speed, a battery level when charging commences, a charging outlet type, a charging cost (e.g., dollars per hour), etc., associated with the charging location and/or with charging station(s) at the charging location. As described further herein, the charging schedule component 130 can, during charging operations for the vehicle 102, generate charging schedules and alter existing charging schedules. In addition, the charging schedule component 130 can, during driving operations for the vehicle 102, determine an applicable charging schedule for the vehicle 102 based on a current or predicted location of the vehicle 102, a time period corresponding to the current or predicted location, etc.

Figure 2:
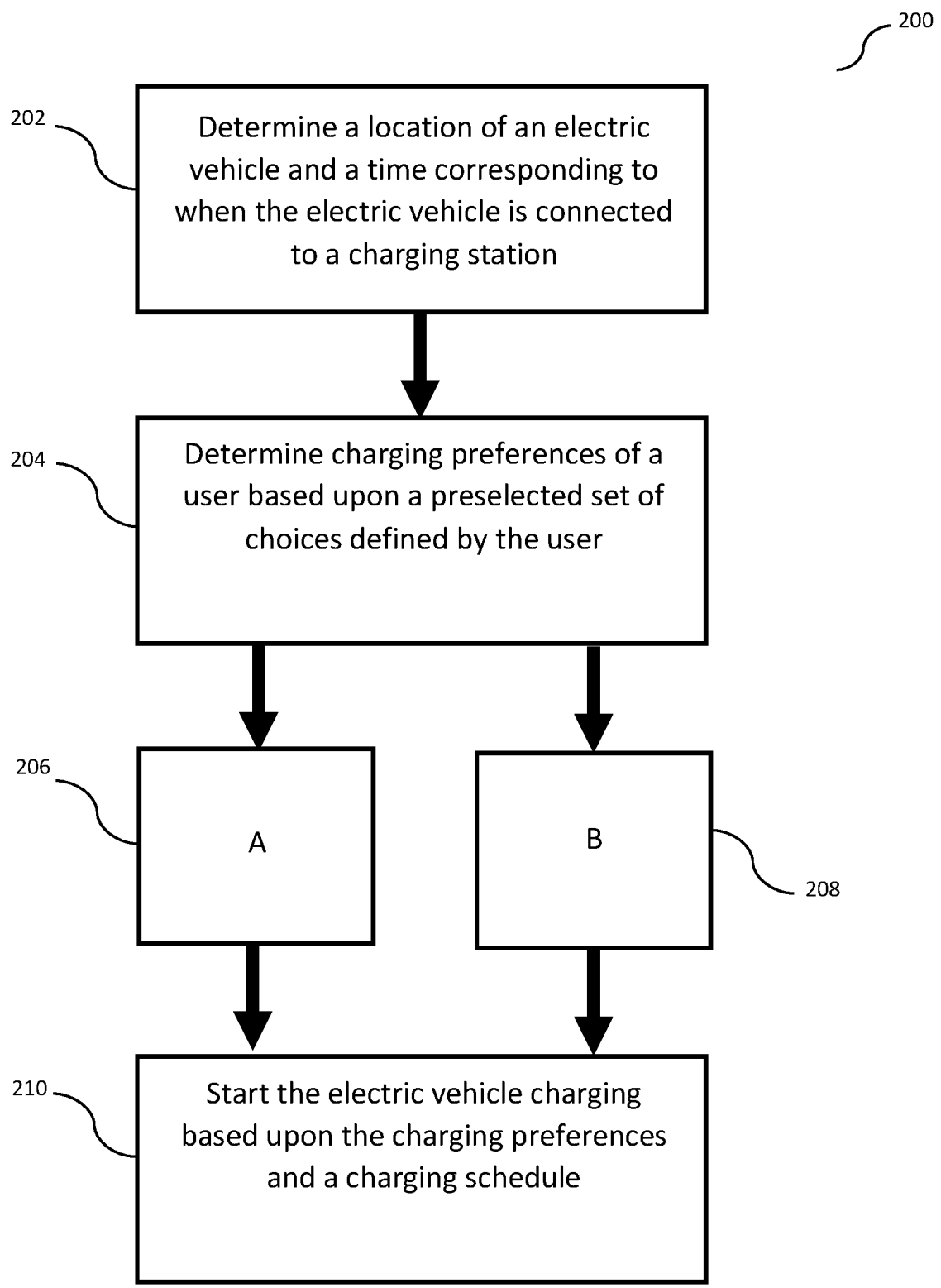
FIG. 2 illustrates a flowchart illustrating an example method for generating a charging schedule for an electric vehicle according to one aspect of the disclosure.

Referring now to FIG. 2, which is described in conjunction with the example operating environment 100 of FIG. 1, an example method 200 for generating a charging schedule for an electric vehicle (e.g., which can be used by the vehicle charging scheduling system 110) is illustrated. In block 202, the method 200 can include determining a location of an electric vehicle and a time corresponding to when the electric vehicle is connected to a charging station. In an aspect, vehicle charging scheduling system 110 (e.g., in conjunction with processor 120, memory 122, communications device 124, and/or location determining device 126) can determine, during the connection operation of the electric vehicle 102 to a charging station, the location of the electric vehicle 102 and the time the connection with the electric vehicle 102 occurred. For example, vehicle charging scheduling system 110 can determine the location of the electric vehicle 102 upon connection to the charging station (e.g., according to a GPS signal or upon communication with the charging station). In another aspect, the vehicle charging scheduling system 110, in box 202, may inform the user of the charging status of the vehicle.

In block 204, the method 200 further determines charging preferences of a user based upon a preselected set of choices defined by the user, as described above. For example, the preferences may include, among other preferences, a default charging schedule, for example, charging the vehicle upon connection to a charging station. Charging on-demand may be a version of immediately charging the vehicle upon connection to the charging station. In another aspect, charging on-demand may be a version of charging at a specific time selected by the user. Additionally, for example, the preferences selected by the user may include adjusting the charging schedule based upon additional preferences input by the user, as explained above.

In block 210, the method starts the electric vehicle charging based upon the charging preferences and the charging schedule. Blocks 206 and 208 are described below in greater detail in reference to FIGS. 3A and 3B respectively. In one aspect, the electric vehicle charging schedule may be altered or adjusted during any point in time when the vehicle is connected to a charging station. For example, the alterations or adjustments may be based upon input changes by a user regarding preferences and/or charging station information changes. For example, the updated preferences or information changes may be performed manually by a user or autonomous by a processor described above, or a remote server.

Figure 3A:
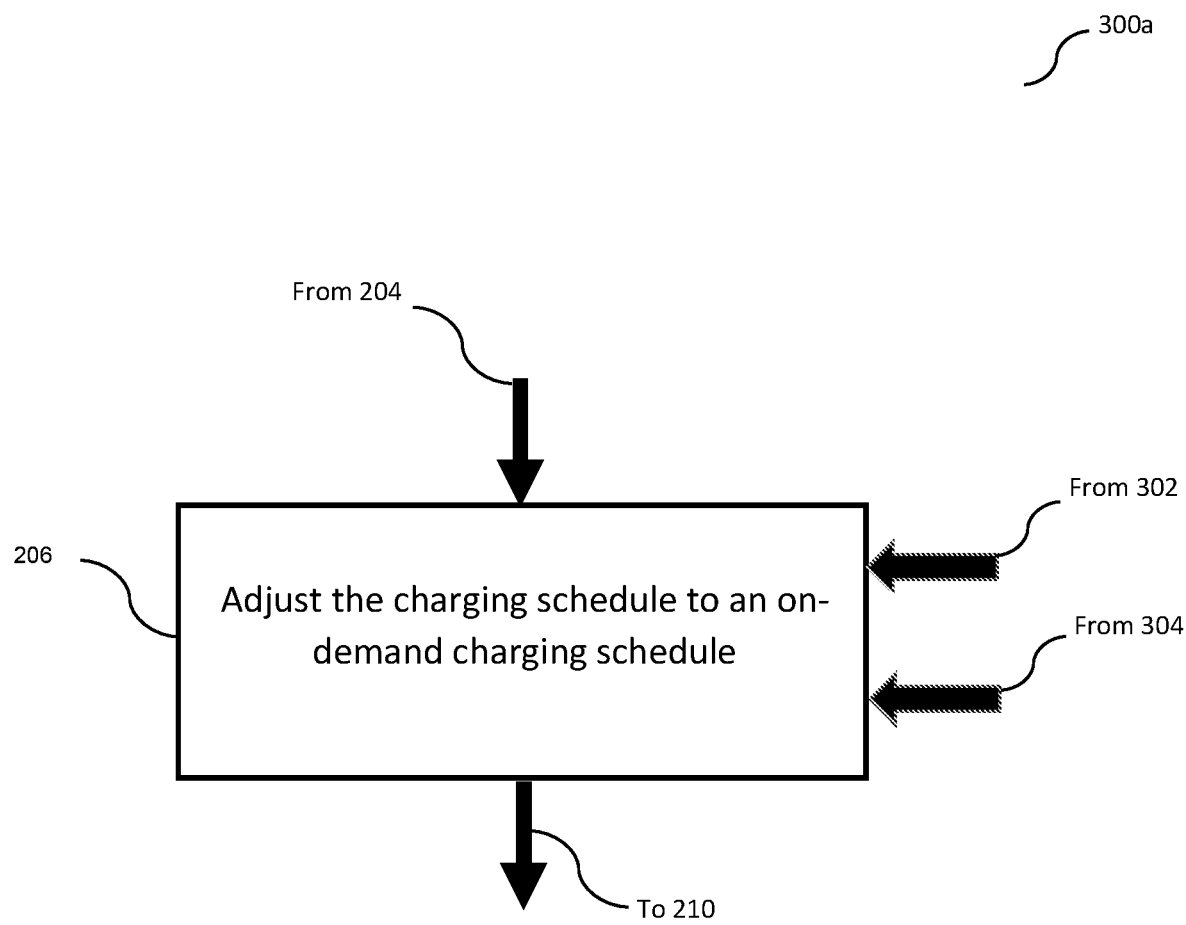
FIG. 3A illustrates a flowchart illustrating an example method for generating a charging schedule for an electric vehicle according to one aspect of the disclosure.

Referring now to FIG. 3A, which is described in conjunction with block 206 of FIG. 2, an example method 300a for generating a charging schedule for a vehicle (e.g., which can be used by the vehicle charging scheduling system 110) is illustrated. In block 206, the method adjusts the charging schedule to an on-demand charging schedule. In one aspect, the on-demand charging schedule may be implemented based upon a user preference. In one aspect, the on-demand charging schedule is implemented based upon the failed implementation of a user preference. The failed implementation of a user preference will be explained below, in reference to FIG. 3B.

In box 206, the on-demand charging schedule may start charging the vehicle and stop charging the vehicle at different times. For example, the charging schedule is adjusted to start charging the electric vehicle at a start time specified by the user, and to stop charging at an end time specified by the user. In another aspect, the charging schedule is adjusted to start charging the electric vehicle at a start time specified by the user, and to stop charging at a time when the vehicle is disconnected from the charging station. In another aspect, the charging schedule is adjusted to start charging the electric vehicle at a start time specified by the user, and to stop charging at a time calculated by the charging schedule component 130 based on the amount of time to reaching a full charge.

Figure 3B:
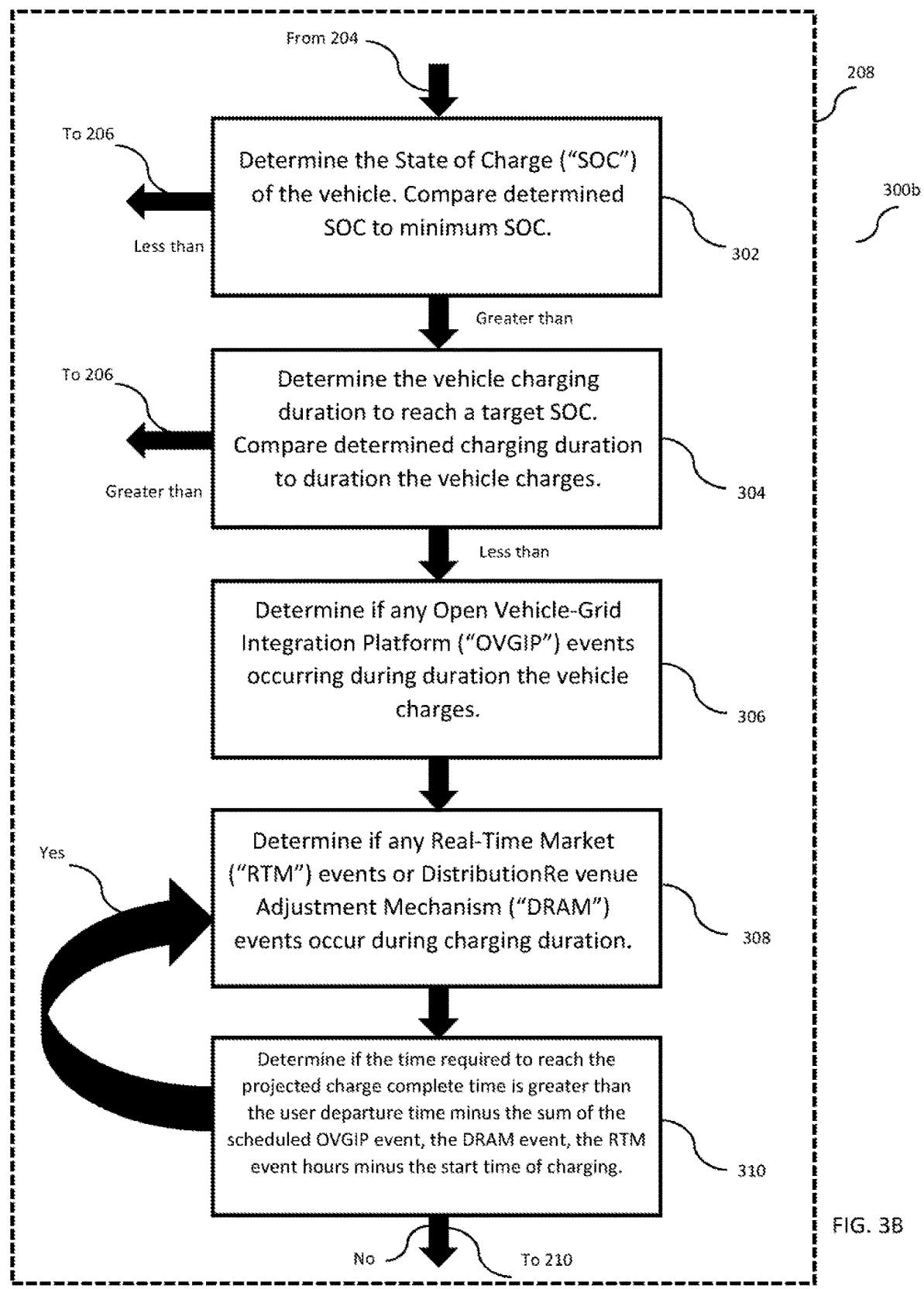
FIG. 3B illustrates a flowchart illustrating an example method for generating a charging schedule for an electric vehicle according to one aspect of the disclosure.

Referring now to FIG. 3B, which is described in conjunction with block 208 of FIG. 2, an example method 300b for generating a charging schedule for a vehicle (e.g., which can be used by the vehicle charging scheduling system 110) is illustrated. For example, in method 300b, the method adjusts the charging schedule based upon a user preference to participate in a "Smart Charge" schedule. A "Smart Charge" may be a charging schedule that is based upon utility company events. A utility company event may be, for example, a program that reduces the cost of energy when charging the vehicle. For example, a user may select to charge the vehicle during only the lowest cost per kilowatt of energy.

In block 302, the method determines the state of charge ("SOC") of the vehicle. In one aspect, the method determines if the SOC of the vehicle is greater to or less than a minimum SOC. The minimum SOC may be a value that would allow the vehicle to run essential devices. The essential device may be the starter, door locks, lights, the telematics system, and the vehicle system. When the SOC of the vehicle is less the minimum SOC, the method proceeds to box 206 of FIG. 3A, as described above. When the SOC of the vehicle is greater than or equal to a minimum SOC than the method proceeds to box 304, as described below. For example SOC>=$MIN_{SOC}$.

In block 304, the method determines a vehicle charging duration to reach a target SOC. In one aspect, a target SOC may be user preference based upon the next destination of the vehicle. For example, the user may select driving 100 miles to a next destination to charge, thus, the target SOC would be a charge value to reach the selected destination. In one aspect the target SOC may be an arbitrary charge value of the vehicle based on a user preference. For example, the user may always want to have a charge value of 75% charged.

In one aspect, the method determines if the charging duration for a target SOC is less than the length of the departure time of the electric vehicle minus the start charge time. For example, $T_{TSOC} < (T_{dep} - T_{start})$. For example, the charge duration to reach the target SOC is 4 hours, the departure time is 8 P.M. (20:00) and the charge was started as 12 P.M. (12:00). Thus, 4<(20−12). When the method determines the equation is satisfied, the method continues to block 306. When the method determined is not satisfied, the method proceeds to box 206 of FIG. 3A, as described above.

In block 306, the method determines if there are any qualifying Open Vehicle-Grid Integration Platform ("OVGIP") events occurring during the vehicle charging schedule. OVGIP may be a software application that connects electric-vehicle supply equipment and electric vehicles to various nodes to allow utilities to more proactively manage charging activity that could help with a variety of grid services. For example, OVGIP allows utility companies to provide time of use ("TOU") pricing, peak load reduction, load balancing for intermittent solar and wind production, demand-charge mitigation and other grid services to electric vehicles. In one aspect, any event would be an notification via the OVGIP.

In one aspect, the OVGIP event may be an event that the user is qualified for. For example, the user may be qualified for the OVGIP event based upon enrollment matching, location matching, utility company matching, and whether the user has completed an enrollment for the specificity utility company.

In one aspect, the method determines if the length of the OVGIP event plus the charging duration for a target SOC is less than the length of the departure time of the electric vehicle minus the start charge time. For example, $(T_{OVGIP}+T_{TSOC})<(T_{dep}-T_{start})$. For example, the length of the OVGIP is 2 hours, the charge duration to reach the target SOC is 4 hours, the departure time is 8 P.M. (20:00) and the charge was started as 12 P.M. (12:00) Thus, $(4+2)<(20-12)$. When the method determines the equation is satisfied, the vehicle charging schedule is adjusted to charge for the entire OVGIP event. When the method determines the equation is not satisfied, the vehicle charging schedule is adjusted to charge only for the length of time necessary to keep the equation satisfied.

In block 308, the method determines if there are any qualifying Real-Time Market ("RTM") events or Distribution Revenue Adjustment Mechanism ("DRAM") events occurring during the vehicle charging schedule. RTM, for example, may be the rates of energy to charge a vehicle at a specific time. DRAM, for example, may be an amount charged by the utility provider to increase revenue during specific periods time. For example, a DRAM event may be a period of time when the $0 is charged per kilowatt hour.

In one aspect, the RTM event and the DRAM event may be an event that the user is qualified for. For example, the user may be qualified for the RTM event and the DRAM event based upon enrollment matching, location matching, utility company matching, and whether the user has completed an enrollment for the specificity utility company.

In one aspect, the method determines if the length of the RTM event or the DRAM event plus the charging duration for a target SOC is less than the length of the departure time of the electric vehicle minus the start charge time. For example, $((T_{RTM} \text{ or } T_{DRAM})+T_{TSOC})<(T_{dep}-T_{start})$. For example, the length of the RTM event and the DRAM event is 2 hours, the charge duration to reach the target SOC is 4 hours, the departure time is 8 P.M. (20:00) and the charge was started as 12 P.M. (12:00) Thus, $(4+2)<(20-12)$. When the method determines the equation is satisfied, the vehicle charging scheduled is adjusted to charge for the entire RTM event or the DRAM event. When the method determines the equation is not satisfied, the vehicle charging schedule is adjusted to charge only for the length of time necessary to keep the equation satisfied.

In one aspect the method determines if the RTM event or the DRAM event has a greater economic impact on the user. When the RTM event is determined to have a greater economic impact on the user, only the RTM event is considered. When the DRAM event is determined to have a greater economic impact on the user, only the DRAM event is considered. In one aspect the RTM event and the DRAM event may occur at different times within the time the vehicle is connected to the charging station, thus allowing the participate of both events.

In block 310, the method determines if the time required to reach the projected charge complete time is greater than the user departure time minus the sum of the scheduled OVGIP event, the DRAM event, the RTM event hours minus the start time of charging. For example, $T_{TOC}>(T_{dep}-(T_{OVGIP}+T_{DRAM}+T_{RTM}))-T_{start}$. For example, if the time to reach the projected charge complete is 8 hours, the departure time is 11 P.M. (23:00), the OVGIP event is 1 hour, the DRAM event is 1 hour, the RTM event is 2 hours and the start charge time is 10:00 A.M. (10:00). Thus, for example, the method determines if $8>(23-(1+1+2))-10$. Therefore, in this example, 8 is not greater than 9, and the method continues to box 210, as explained above. For example, if the equation above is satisfied, the method continues to box 308 to adjust the events to the system participates in.

Aspects of the present disclosure can be implemented using hardware, software, or a combination thereof and can be implemented in one or more computer systems or other processing systems. In one aspect, the disclosure is directed toward one or more computer systems capable of carrying out the functionality described herein. An example of such a computer system 400 is shown in FIG. 4.

Figure 4:
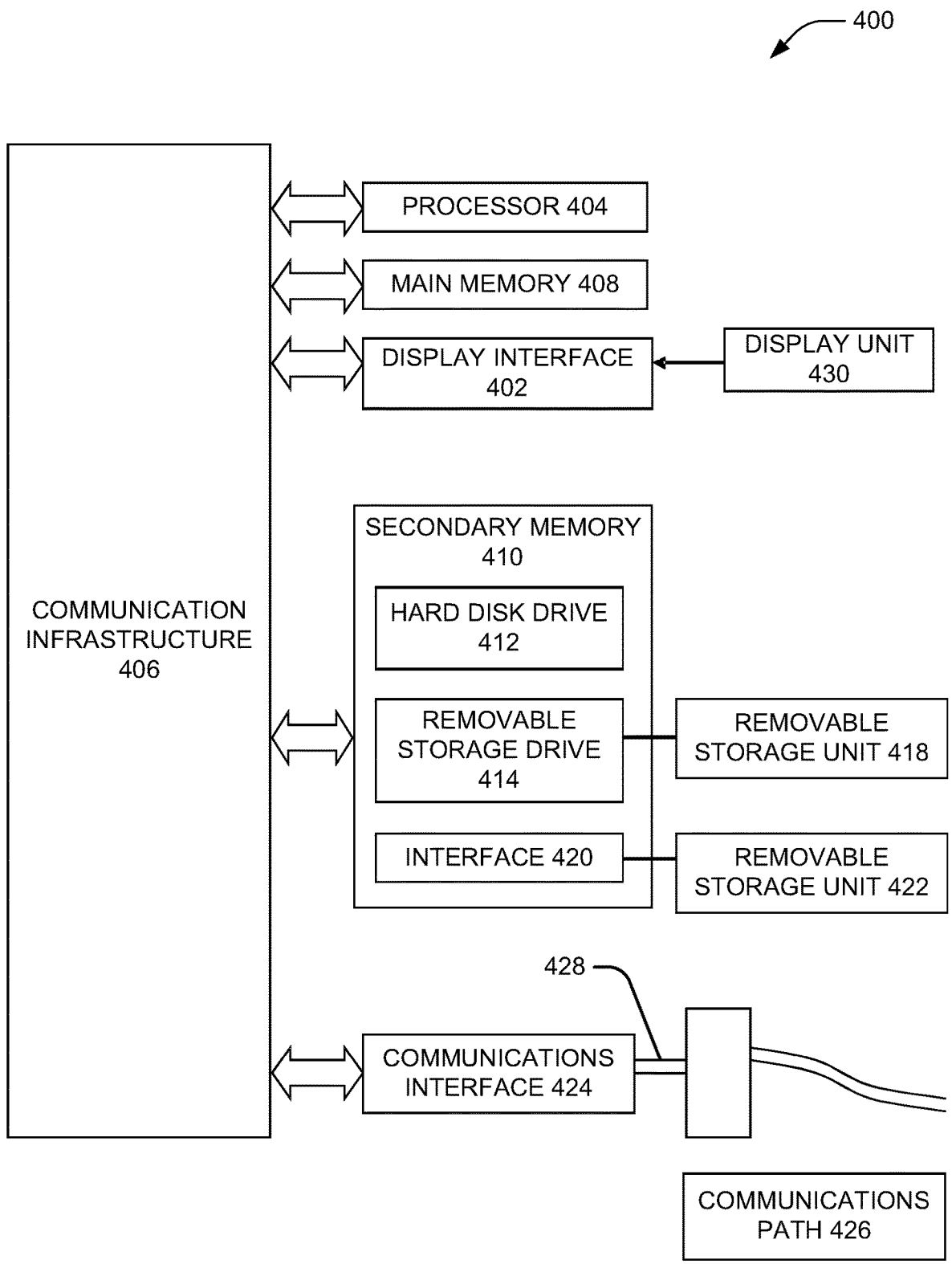
FIG. 4 presents an example system diagram of various hardware components and other features according to one aspect of the disclosure.

FIG. 4 presents an example system diagram of various hardware components and other features, for use in accordance with an aspect of the present disclosure. Aspects of the present disclosure can be implemented using hardware, software, or a combination thereof and can be implemented in one or more computer systems or other processing systems. In one example variation, aspects described herein can be directed toward one or more computer systems capable of carrying out the functionality described herein. An example of such a computer system 400 is shown in FIG. 4.

Computer system 400 includes one or more processors, such as processor 404. The processor 404 is connected to a communication infrastructure 406 (e.g., a communications bus, cross-over bar, or network). In one example, processor 120 can include processor 404. Various software aspects are described in terms of this example computer system. After reading this description, it will become apparent to a person skilled in the relevant art(s) how to implement aspects described herein using other computer systems and/or architectures.

Computer system 400 can include a display interface 402 that forwards graphics, text, and other data from the communication infrastructure 406 (or from a frame buffer not shown) for display on a display unit 430. Display unit 430 can include display 128, in one example. Computer system 400 also includes a main memory 408, preferably random access memory (RAM), and can also include a secondary memory 410. The secondary memory 410 can include, for example, a hard disk drive 412 and/or a removable storage drive 414, representing a floppy disk drive, a magnetic tape drive, an optical disk drive, etc. The removable storage drive 414 reads from and/or writes to a removable storage unit 418 in a well-known manner. Removable storage unit 418, represents a floppy disk, magnetic tape, optical disk, etc., which is read by and written to removable storage drive 414. As will be appreciated, the removable storage unit 418 includes a computer usable storage medium having stored therein computer software and/or data.

In alternative aspects, secondary memory 410 can include other similar devices for allowing computer programs or other instructions to be loaded into computer system 400. Such devices can include, for example, a removable storage unit 422 and an interface 420. Examples of such can include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to computer system 400. In an example, memory 122 can include one or more of main memory 408, secondary memory 410, removable storage drive 414, removable storage unit 418, removable storage unit 422, etc.

Computer system 400 can also include a communications interface 424. Communications interface 424 allows software and data to be transferred between computer system 400 and external devices. Examples of communications interface 424 can include a modem, a network interface (such as an Ethernet card), a communications port, a Personal Computer Memory Card International Association (PCMCIA) slot and card, etc. Software and data transferred via communications interface 424 are in the form of signals 428, which can be electronic, electromagnetic, optical or other signals capable of being received by communications interface 424. These signals 428 are provided to communications interface 424 via a communications path (e.g., channel) 426. This path 426 carries signals 428 and can be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive, a hard disk installed in a hard disk drive, and/or signals 428. These computer program products provide software to the computer system 400. Aspects described herein can be directed to such computer program products. Communications device 124 can include communications interface 424.

Computer programs (also referred to as computer control logic) are stored in main memory 408 and/or secondary memory 410. Computer programs can also be received via communications interface 424. Such computer programs, when executed, enable the computer system 400 to perform various features in accordance with aspects described herein. In particular, the computer programs, when executed, enable the processor 404 to perform such features. Accordingly, such computer programs represent controllers of the computer system 400. Computer programs can include vehicle charging profile system 110.

In variations where aspects described herein are implemented using software, the software can be stored in a computer program product and loaded into computer system 400 using removable storage drive 414, hard disk drive 412, or communications interface 420. The control logic (software), when executed by the processor 404, causes the processor 404 to perform the functions in accordance with aspects described herein as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects described herein are implemented using a combination of both hardware and software.

Figure 5:
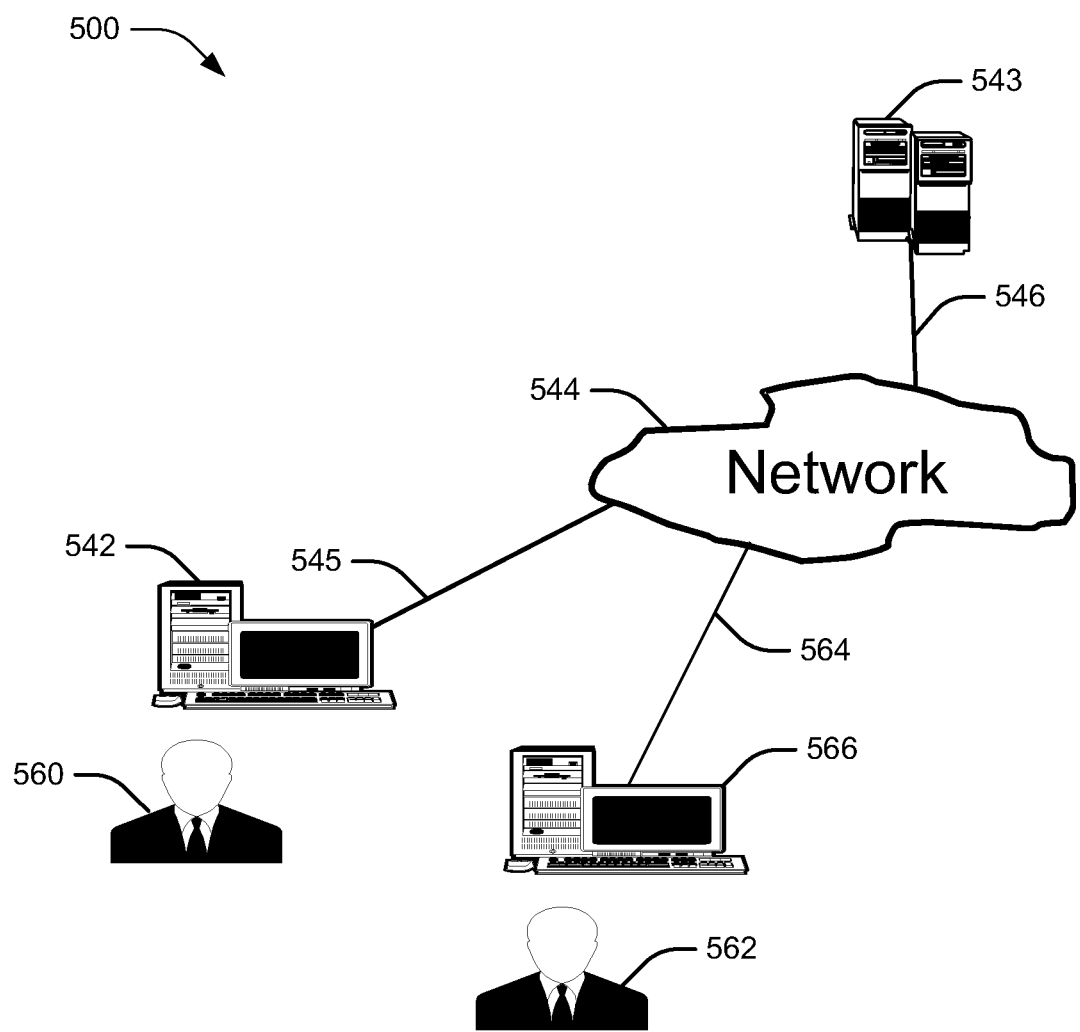
FIG. 5 is a block diagram of various example system components according to one aspect of the disclosure.

FIG. 5 is a block diagram of various example system components, in accordance with an aspect. FIG. 5 shows a communication system 500 usable in accordance with aspects described herein. The communication system 500 includes one or more accessors 560, 562 (also referred to interchangeably herein as one or more "users") and one or more terminals 542, 566. For example, terminals 542, 566 can include vehicle 102 or a related system (e.g., vehicle charging profile system 110, processor 120, communications device 124, etc.), and/or the like. In one aspect, data for use in accordance with aspects described herein is, for example, input and/or accessed by accessors 560, 562 via terminals 542, 566, such as personal computers (PCs), minicomputers, mainframe computers, microcomputers, telephonic devices, or wireless devices, such as personal digital assistants ("PDAs") or a hand-held wireless devices coupled to a server 543, such as a PC, minicomputer, mainframe computer, microcomputer, or other device having a processor and a repository for data and/or connection to a repository for data, via, for example, a network 544, such as the Internet or an intranet, and couplings 545, 546, 564. The couplings 545, 546, 564 include, for example, wired, wireless, or fiberoptic links. In another example variation, the method and system in accordance with aspects described herein operate in a stand-alone environment, such as on a single terminal.

The aspects discussed herein can also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

What is claimed is:

1. A method for scheduling charging of an electric vehicle, comprising:
   determining a location of an electric vehicle and a time corresponding to when the electric vehicle is connected to a charging station;
   determining charging preferences of a user based upon a preselected set of choices defined by the user;
   wherein when the charging preferences are set to adjust a charging schedule, the method further comprises:
      determining a current state of charge of the electric vehicle, and when the determined current state of charge of the electric vehicle is less than a minimum required state of charge, the charging schedule is adjusted to charge the electric vehicle on-demand and the electric vehicle starts charging;
      determining a departure time of the electric vehicle from the charging station, and when the determined current state of charge of the electric vehicle is greater than or equal to a minimum required state of charge, determining when a time period to reach a target state of charge is greater than a time period associated with the departure time of the electric vehicle from the charging station compared to a start charging time, the charging schedule is adjusted to charge the electric vehicle on-demand and the electric vehicle starts charging, and
      determining charging incentives based on utility events, and when the determined current state of charge of the electric vehicle is greater than or equal to a minimum required state of charge and the time period to reach the target state of charge is less than the time period associated with the departure time and start charge time, the charging schedule is adjusted based upon determined charging incentives to facilitate the electric vehicle charging at a time to obtain the determined charging incentives.

2. The method of claim 1, wherein the charging schedule is set to a default of charge the electric vehicle on-demand.

3. The method of claim 1, wherein the charging schedule is adjusted when the determined charging incentive occurs during charging and a time period less than the time period associated with the departure time of the electric vehicle from the charging station compared to the start charging time, a time of use of the charging station.

4. The method of claim 1, wherein the determined charging incentives are based on at least one of real-time market prices, enrollment into a rate program, the location of the charging station, OVGIP events and a utility provider.

5. A system comprising:
a memory that stores instructions for executing processes for scheduling charging of an electric vehicle; and
a processor configured to execute the instructions, wherein the instructions cause the processor to:
determine a location of an electric vehicle and a time corresponding to when the electric vehicle is connected to a charging station;
determine charging preferences of a user based upon a preselected set of choices defined by the user;
wherein when the charging preferences are set to adjust a charging schedule:
determine a current state of charge of the electric vehicle, and when the determined current state of charge of the electric vehicle is less than a minimum required state of charge, the charging schedule is adjusted to charge the electric vehicle on-demand and the electric vehicle starts charging,
determine a departure time of the electric vehicle from the charging station, and when the determined current state of charge of the electric vehicle is greater than or equal to a minimum required state of charge, determining when a time period to reach a target state of charge is greater than a time period associated with the departure time of the electric vehicle from the charging station compared to a start charging time, the charging schedule is adjusted to charge the electric vehicle on-demand and the electric vehicle starts charging, and,
determine charging incentives based on utility events, and when the determined current state of charge of the electric vehicle is greater than or equal to a minimum required state of charge and the time period to reach the target state of charge is less than the time period associated with the departure time and start charge time, the charging schedule is adjusted based upon determined charging incentives to facilitate the electric vehicle charging at a time to obtain the determined charging incentives.

6. The system of claim 5, wherein the charging schedule is set to a default of charge the electric vehicle on-demand.

7. The system of claim 5, wherein the charging schedule is adjusted when the determined charging incentive occurs during charging and a time period less than the time period associated with the departure time of the electric vehicle from the charging station compared to the start charging time, a time of use of the charging station.

8. The system of claim 5, wherein the determined charging incentives are based on at least one of real-time market prices, enrollment into a rate program, the location of the charging station, OVGIP events and a utility provider.

9. A non-transitory computer-readable storage medium containing executable computer program code, the code comprising instructions configured to cause a processor to:
determine a location of an electric vehicle and a time corresponding to when the electric vehicle is connected to a charging station;
determine charging preferences of a user based upon a preselected set of choices defined by the user;
wherein when the charging preferences are set to adjust a charging schedule:
determine a current state of charge of the electric vehicle, and when the determined current state of charge of the electric vehicle is less than a minimum required state of charge, the charging schedule is adjusted to charge the electric vehicle on-demand and the electric vehicle starts charging,
determine a departure time of the electric vehicle from the charging station, and when the determined current state of charge of the electric vehicle is greater than or equal to a minimum required state of charge, determining when a time period to reach a target state of charge is greater than a time period associated with the departure time of the electric vehicle from the charging station compared to a start charging time, the charging schedule is adjusted to charge the electric vehicle on-demand and the electric vehicle starts charging, and,
determine charging incentives based on utility events, and when the determined current state of charge of the electric vehicle is greater than or equal to a minimum required state of charge and the time period to reach the target state of charge is less than the time period associated with the departure time and start charge time, the charging schedule is adjusted based upon determined charging incentives to facilitate the electric vehicle charging at a time to obtain the determined charging incentives.

10. The non-transitory computer-readable storage medium of claim 9, wherein the charging schedule is set to a default of charge the electric vehicle on-demand.

11. The non-transitory computer-readable storage medium of claim 9, wherein the charging schedule is adjusted when the determined charging incentive occurs during charging and a time period less than the time period associated with the departure time of the electric vehicle from the charging station compared to the start charging time, a time of use of the charging station.

12. The non-transitory computer-readable storage medium of claim 9, wherein the determined charging incentives are based on at least one of real-time market prices, enrollment into a rate program, the location of the charging station, OVGIP events and a utility provider.

* * * * *